Nov. 6, 1934.　　　　G. S. MANN　　　　1,979,276
AUTOMATIC GRAMOPHONE
Filed Sept. 22, 1933　　　10 Sheets-Sheet 1
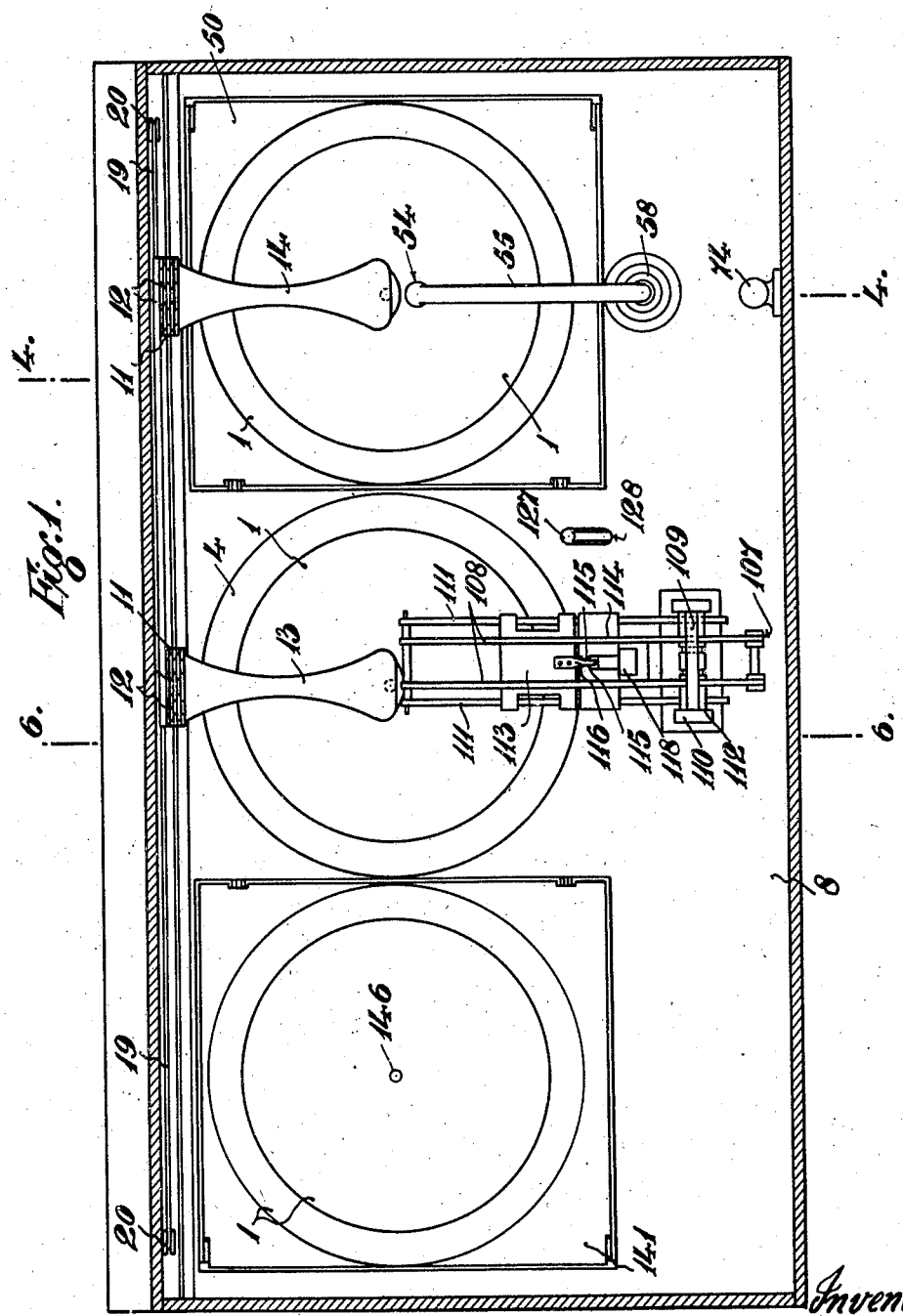

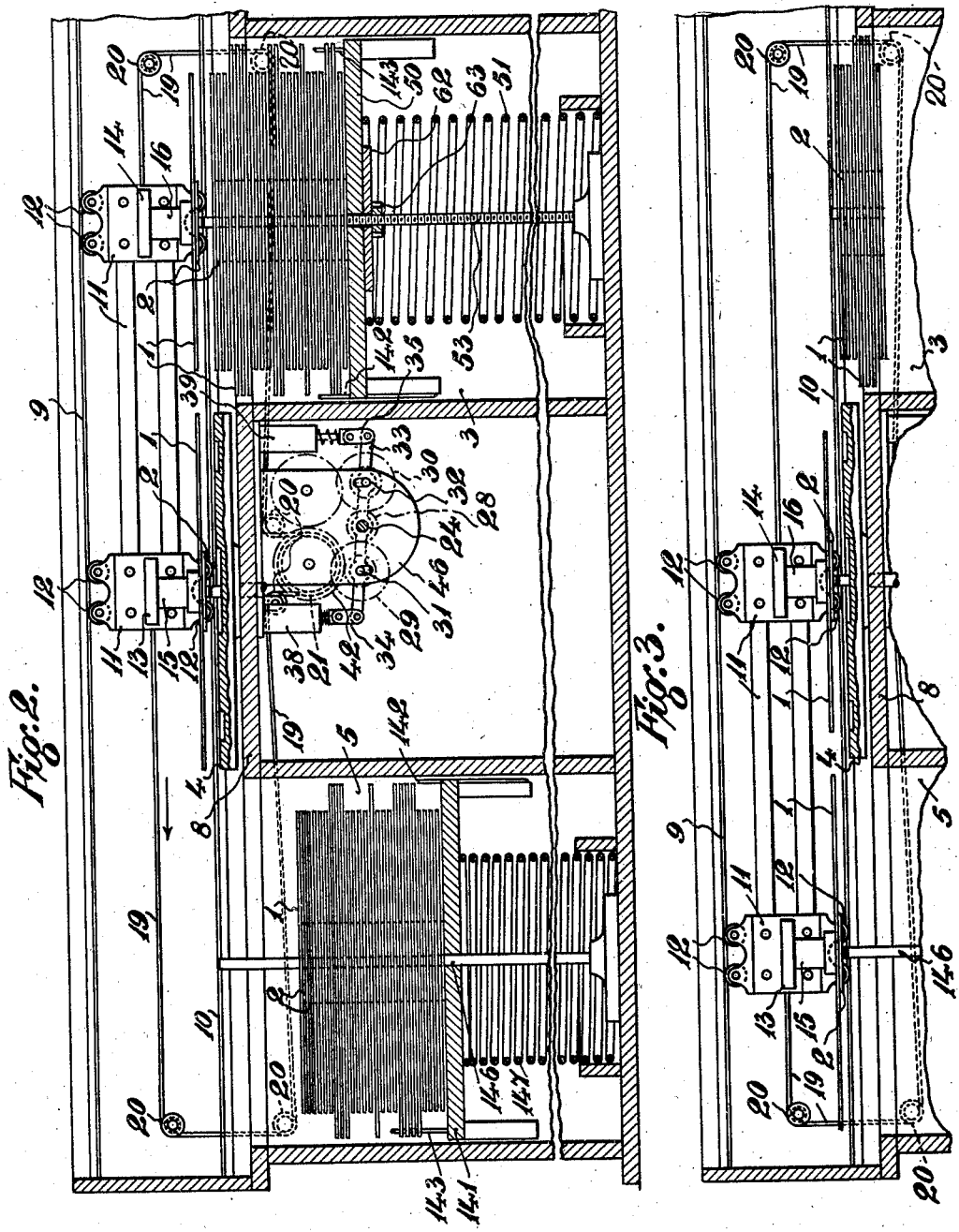

Nov. 6, 1934.     G. S. MANN     1,979,276
AUTOMATIC GRAMOPHONE
Filed Sept. 22, 1933     10 Sheets-Sheet 3
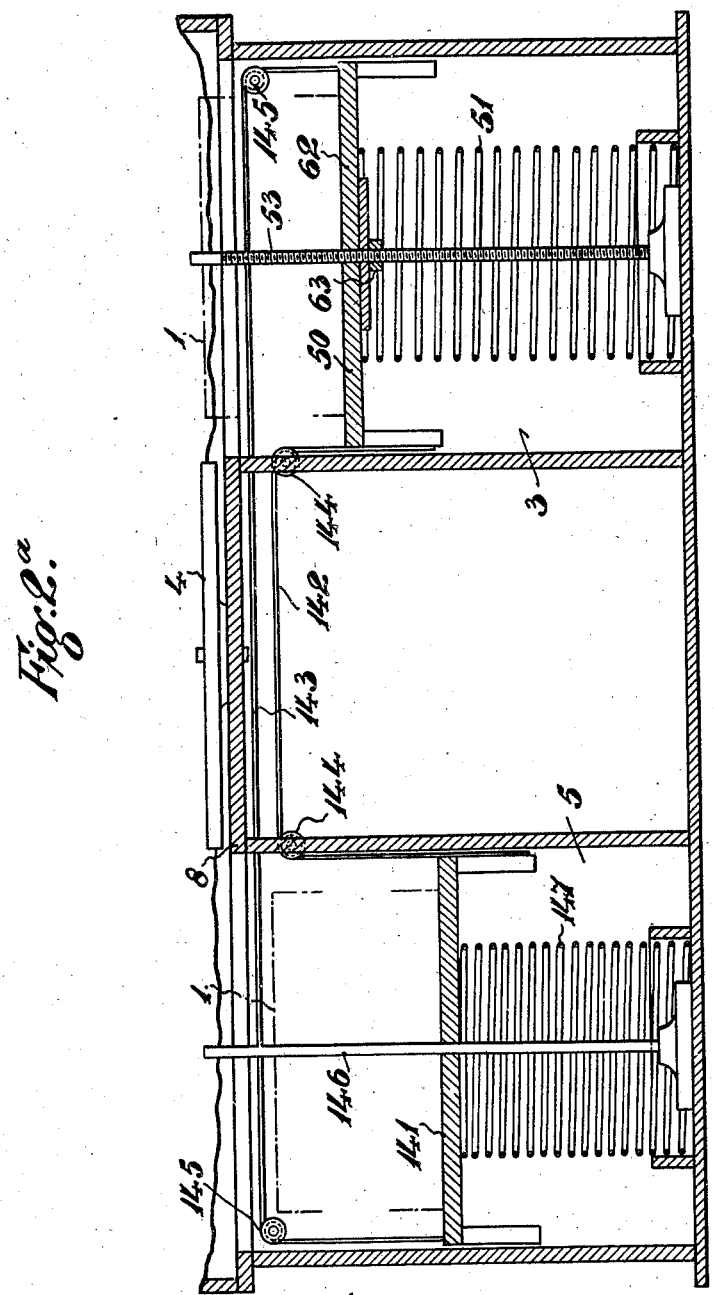

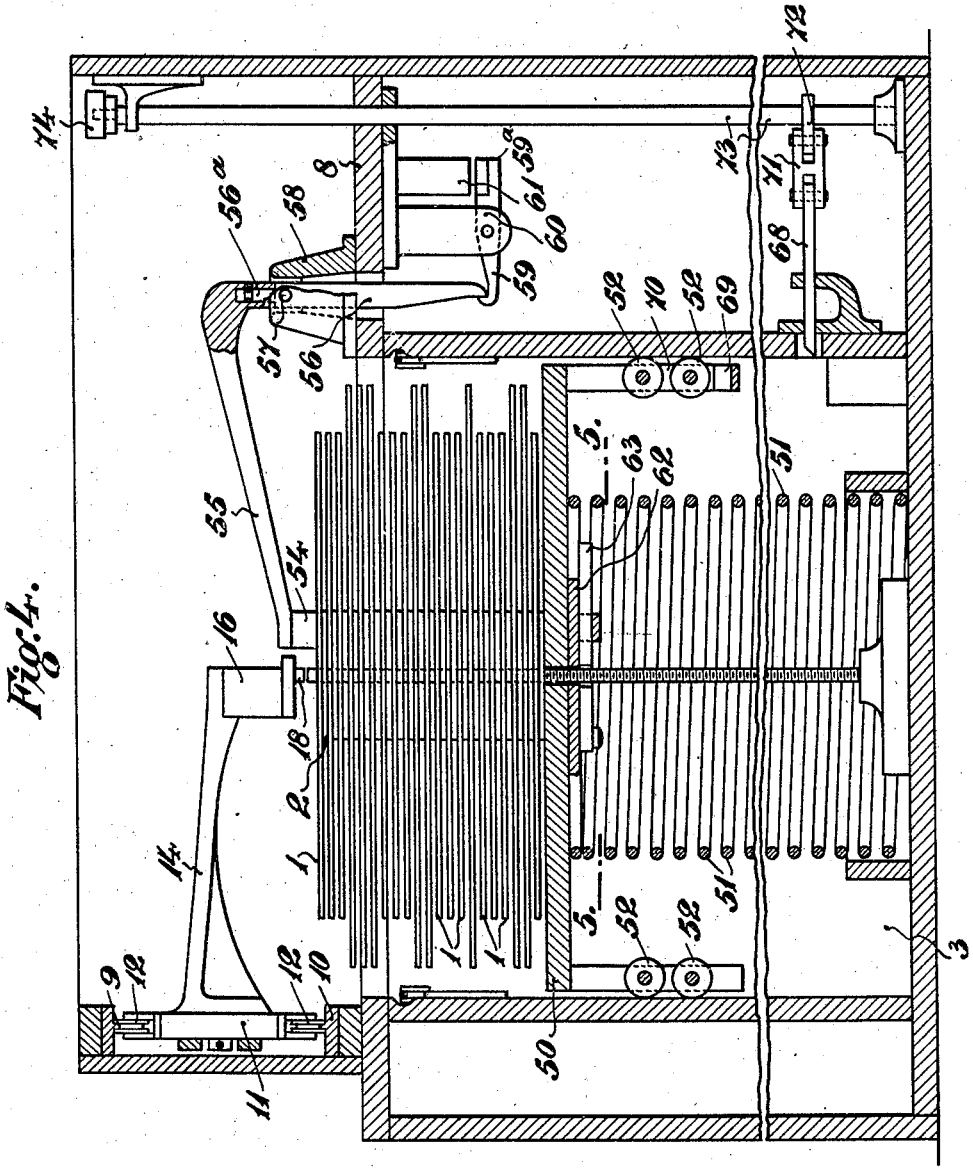

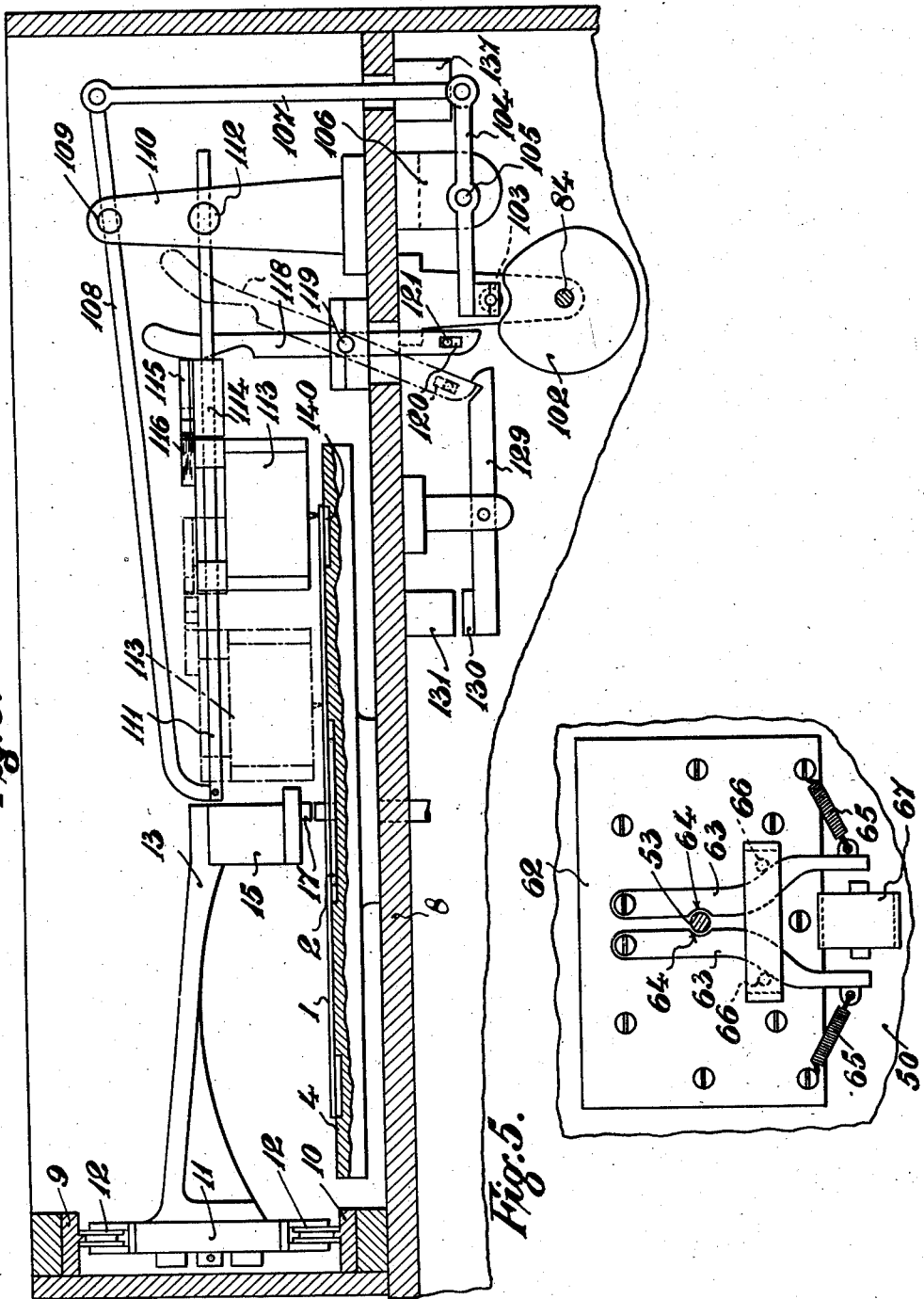

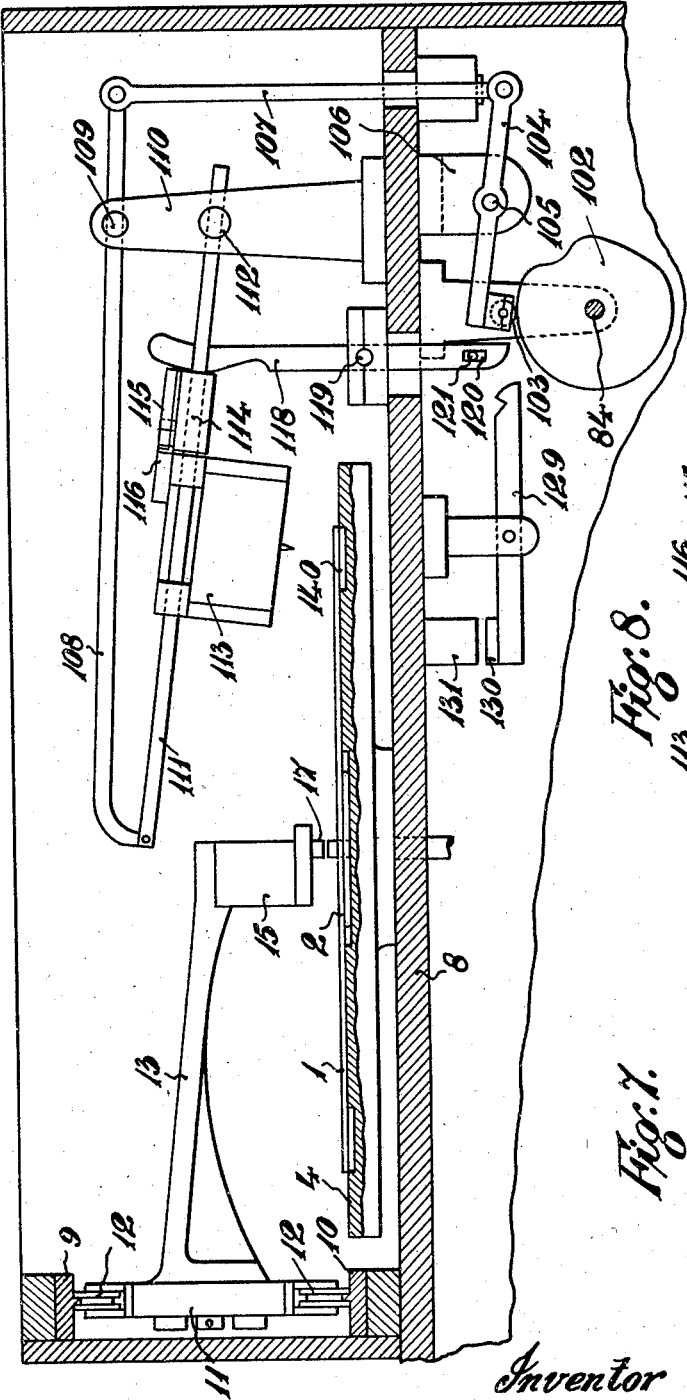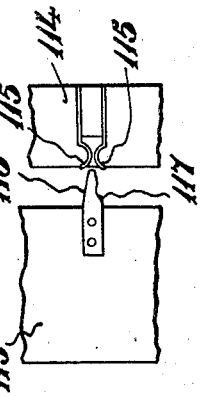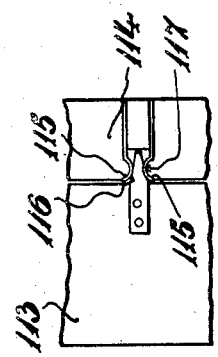
Inventor
GEORGE S. MANN
By Richards & Geus Attorneys

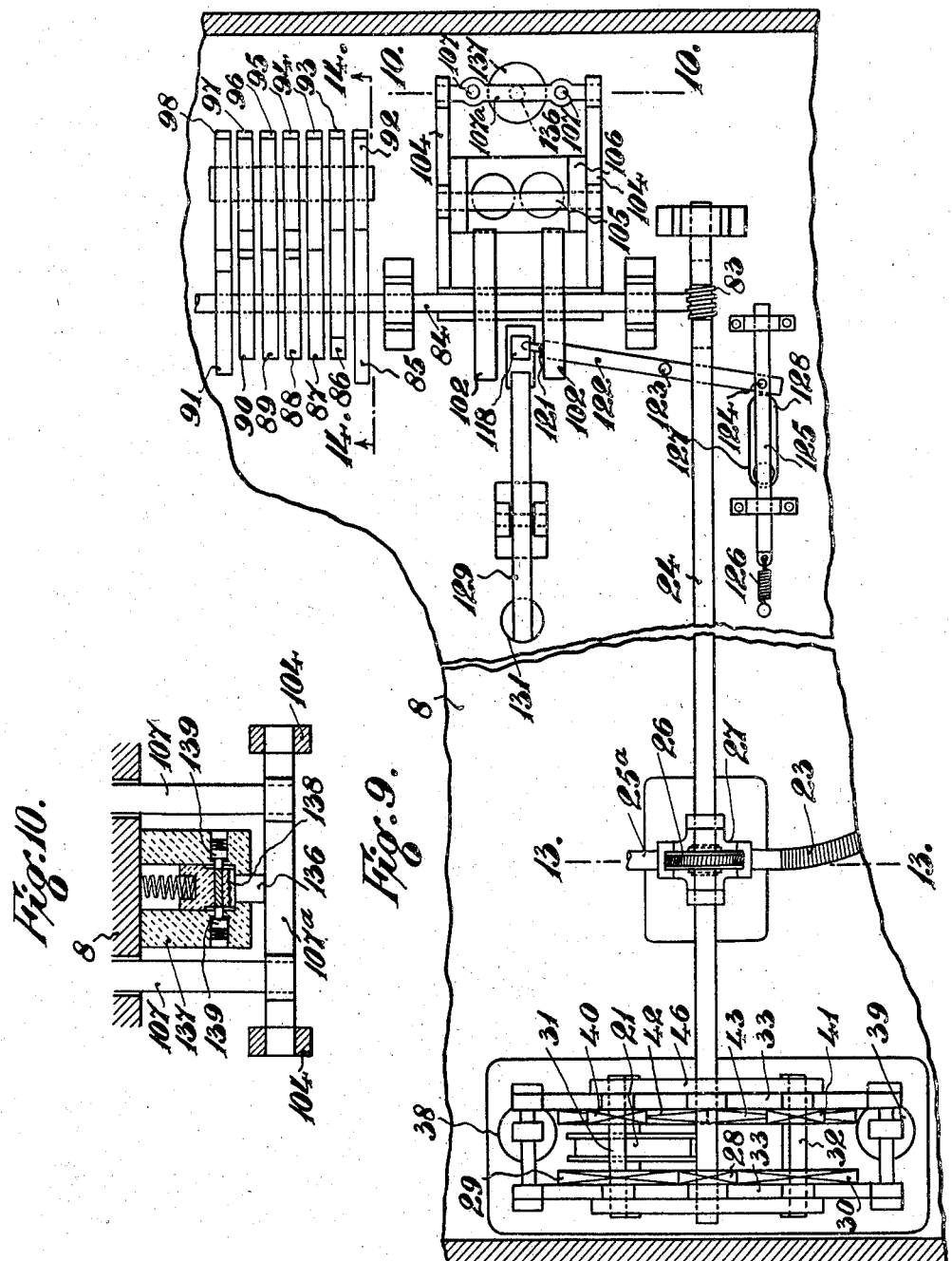

Nov. 6, 1934.  G. S. MANN  1,979,276
AUTOMATIC GRAMOPHONE
Filed Sept. 22, 1933  10 Sheets-Sheet 8
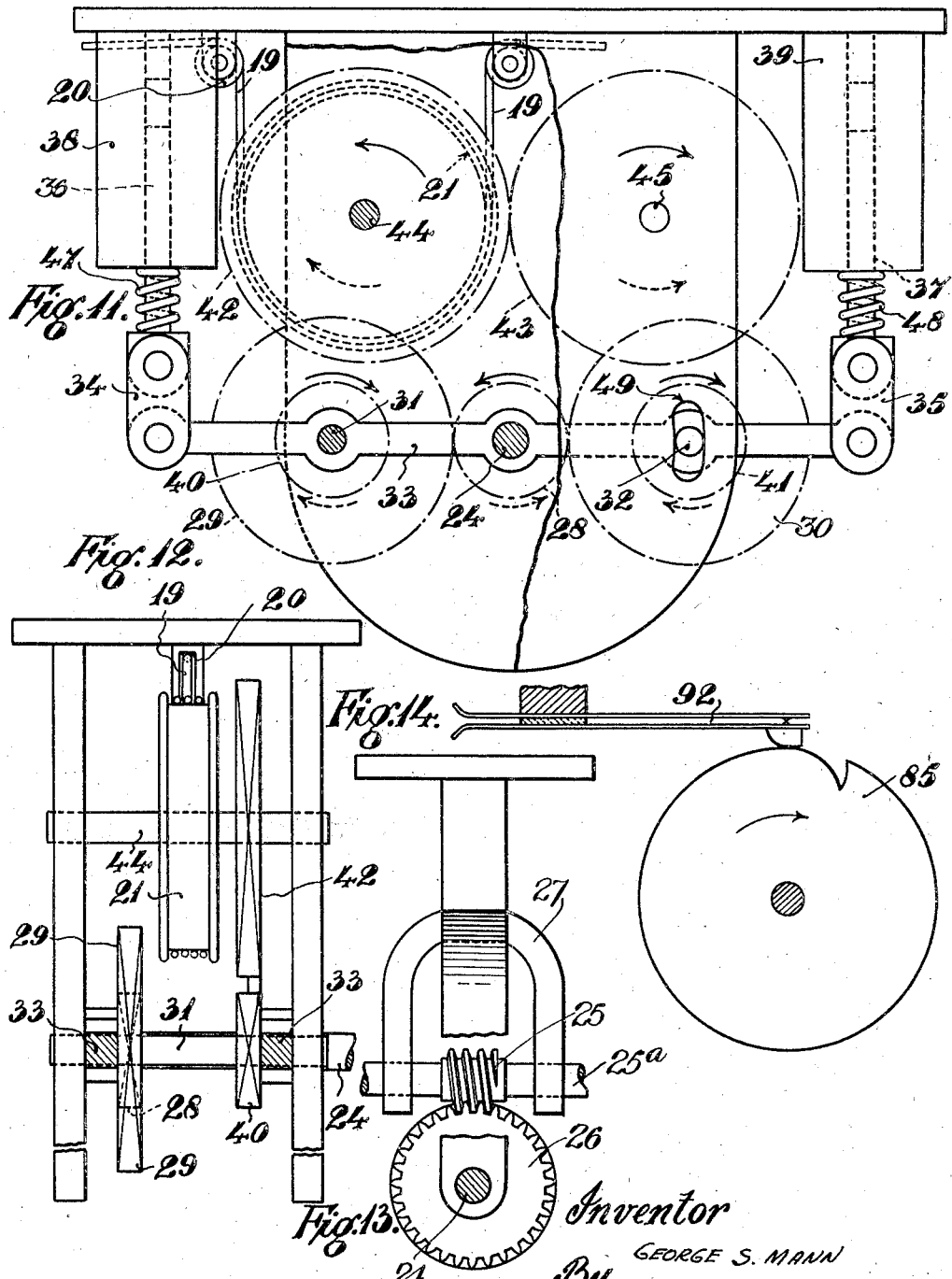

Nov. 6, 1934.  G. S. MANN  1,979,276
AUTOMATIC GRAMOPHONE
Filed Sept. 22, 1933   10 Sheets-Sheet 9
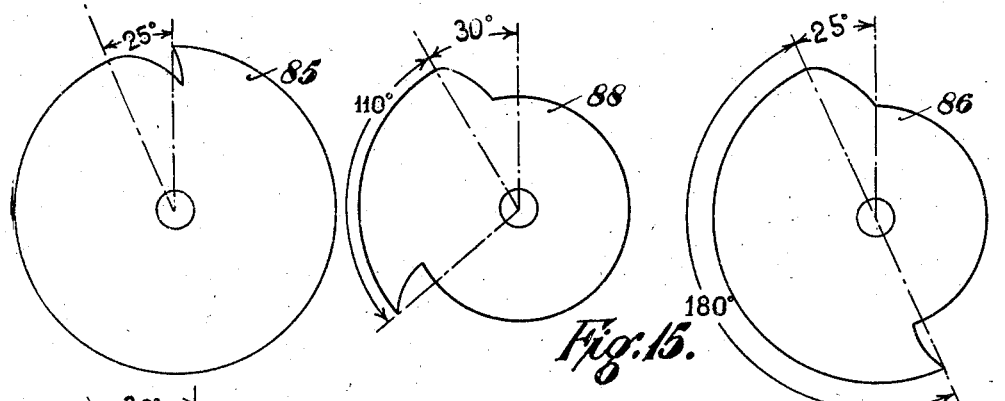
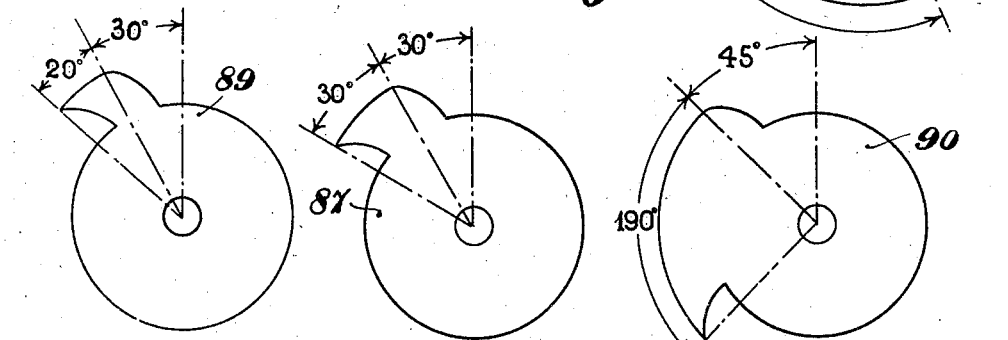
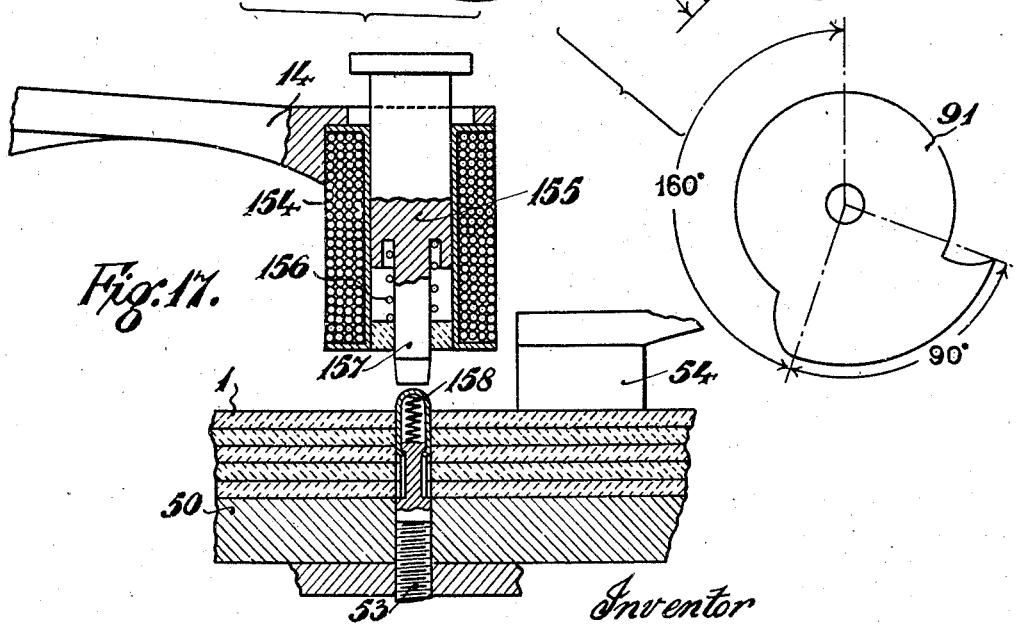
Inventor
GEORGE S. MANN
By
Richards & Geier Attorneys

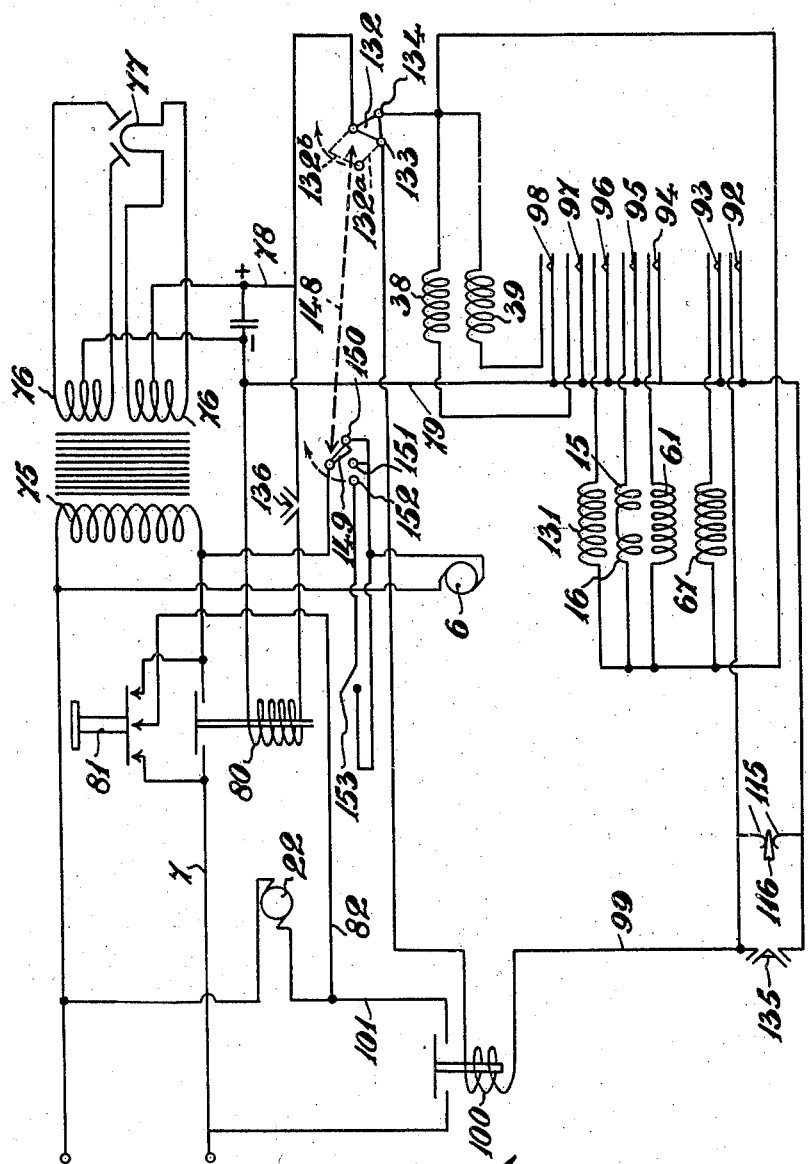

Patented Nov. 6, 1934

1,979,276

UNITED STATES PATENT OFFICE 1,979,276

AUTOMATIC GRAMOPHONE

George Stanley Mann, Ipswich, England

Application September 22, 1933, Serial No. 690,544
In Great Britain March 8, 1932

19 Claims. (Cl. 274—10)

This invention relates to automatic gramophones of the kind having means for automatically changing the records so that a series of records may be played in succession without attention, the record on the turntable being removed after being played and another record being lifted or removed from a pile of records to be played and transferred to the turntable.

One of the objects of the present invention is to provide improved, quicker and more reliable means for automatically changing the records. Another object is to simplify the mechanism and reduce the cost of manufacture of the gramophone. A further object is to enable different sized records, for instance, 10 inch and 12 inch records, to be played indiscriminately.

Figure 1 of the accompanying drawings is a plan of an automatic gramophone in accordance with this invention.

Figure 2 is a longitudinal vertical section through the gramophone, showing the magazine, turntable and used-record well, and the record lifting and transferring carriage the latter being shown in its initial or normal position, records having been lifted from the magazine and from the turntable prior to being transferred.

Figure 2ª is a longitudinal section showing more clearly the inter-connection between the platform in the magazine and played-record well.

Figure 3 is a similar sectional view to Figure 2, but shows the carriage at the end of its travel with the record from the magazine in position over the turntable and the record from the turntable over the well, prior to the said records being released.

Figure 4 is a transverse section through the magazine, on line IV—IV, Figure 1.

Figure 5 is a horizontal section on line V—V, Figure 4, looking in an upward direction, showing the electro-magnetic magazine clutch device.

Figure 6 represents a transverse section on line VI—VI, Figure 1, showing the pick-up carrier arm and its controlling mechanism in the position during playing of a record.

Figure 6ª shows the pick-up carrier arm raised after playing of a record.

Figure 7 is a plan showing more clearly the switch device on the pick-up carrier arm, the said switch being open.

Figure 8 is a similar view showing the pick-up carrier arm switch closed.

Figure 9 is an underside plan, showing the mechanism for controlling the pick-up carrier arm, the switches and their cams for controlling the various circuits, and the reversing gear mechanism for operating the carriage.

Figure 10 is a section corresponding to line X—X, Figure 9, showing the master switch for automatically opening all circuits when the last record has been played.

Figure 11 is an elevation, with part of the casing broken away, of the reversing gear for the carriage.

Figure 12 is an end view of the said reversing gear.

Figure 13 is a cross-section on line XIII—XIII, Figure 9, showing the gearing for the motor drive of the main shaft.

Figure 14 is a section on line XIV—XIV, Figure 9, showing, in elevation, one of the cam-controlled switches.

Figure 15 shows the shapes of the various cams employed for operating the different switches.

Figure 16 is a diagram of the electrical circuits.

Figure 17 shows a modified device for lifting the records.

Referring to Figures 1 to 16, the records to be played may be provided with iron or steel centre pieces; or, as shown, associated with each record 1 is a loose disc 2 of iron or steel, the said disc having a central aperture and being placed beneath the respective records stored in a sunken magazine 3, as hereinafter described, so that each record can be lifted by a magnet which raises the metal disc.

The magazine 3 is disposed at one side of the turntable 4 of the gramophone, and upon the other side of said turntable is a well 5 for receiving played records. The turntable 4 is adapted to be driven by an electric motor 6 (see circuit diagram, Figure 16) permanently connected across input leads 7 from the electric supply mains.

Upon the rear wall of the gramophone cabinet, above the top or motor board 8, is a pair of vertically-spaced horizontal rails 9, 10, upon which a carriage 11 disposed in a vertical plane, is mounted to run. The carriage is provided with top and bottom rollers 12 engaging the respective rails and it carries two forwardly-extending arms 13, 14, spaced in the longitudinal direction of the gramophone so that one arm 13 can lie over the turntable 4 while the other arm 14 lies over the pile of records to be played, in the magazine 3. The said arms 13, 14, carry at their outer ends electromagnets 15, 16, respectively, the said magnets carrying depending centring studs 17, 18, adapted to engage the centre holes of the records 1 and discs 2, when the records are raised, and being so disposed that the stud 17 of magnet 15 will lie directly over the centre of the record on the turntable while the stud 18 of magnet 16 will lie directly over the centre of the records in the magazine.

The carriage 11 is adapted to be traversed along the rails 9, 10, by a cable 19 attached to opposite ends (see Figure 2) and passing over pulleys 20 to a winding drum 21 beneath the top board 8 of the cabinet, the cable being wound upon the drum so that as the latter is rotated one side of the cable is wound on to the drum while the other side is paid off, thus effecting the traverse of the carriage. The said winding drum 21 is arranged to be rotated, first in one direction and then in the other to cause the carriage to move in opposite directions, by means of an electric motor 22 (see circuit diagram Figure 16) which, by means of a flexible shaft 23 (Figures 9 and 13), drives a main shaft 24 through worm gearing comprising a worm 25 on worm shaft 25ᵃ driven by the flexible shaft 23, and a worm-wheel 26 on the main shaft 24, the said worm shaft 25ᵃ and main shaft 24 being supported adjacent the gearing by means of a bracket 27 attached to the cabinet (Figure 13). The shaft 24 drives the drum 21 through reversible gearing, shown in Figures 11 and 12. Thus, fixed on the shaft 24 is a pinion 28 permanently in mesh with two toothed wheels 29, 30, disposed on opposite sides of shaft 24 and fixed on shafts 31, 32, rotatably mounted between corresponding arms of two spaced levers 33 free to rock about shaft 24. The outer ends of levers 33 are connected together and the respective ends are coupled, by links 34, 35, to plungers or cores 36, 37, of solenoids 38, 39, adapted to be energized as hereinafter described. Fixed on the same shafts 31, 32, that carry the wheels, 29, 30, are smaller toothed wheels 40, 41, lying in the same plane as toothed wheels 42, 43, fixed on spindles 44, 45, mounted between the sides of the gear frame or casing 46, the winding drum 21 being also mounted upon the spindle 44. The wheels 42, 43, are permanently in mesh, but when the levers 33 are horizontal, as shown in Figure 11, and neither of the solenoids 38, 39, is energized, both the wheels 40, 41, are out of mesh with the corresponding wheels 42, 43, the gear being then in its neutral position, so that no motion is imparted from the main shaft 24 to the winding drum 21 and carriage 11. When, however, one or other of the solenoids 38, 39, is energized, the corresponding end of the coupled levers 33 will be raised to take one or other of the wheels 40, 41, into mesh with the opposed wheel 42 or 43, thus causing the winding drum and carriage to be operated in one direction or the other. Springs 47, 48, surrounding the plungers 36, 37, tend to maintain the levers 33 horizontal, with the gear in neutral position. Slots 49 in the casing 46 co-operate with the ends of shafts 31, 32, to limit the travel of the levers 33. The full-line arrows show the direction of motion of the various wheels when the left-hand solenoid 38 is energized, giving direct drive, and the dotted-line arrows show the direction of motion when solenoid 39 is energized, giving a reversed drive through intermediate wheel 43.

In the initial position of the carriage 11 the magnet 15 lies over the turntable and the magnet 16 lies over the pile of records 1 in magazine 3 which are to be played, as shown in Figures 1 and 2. The said records are placed, with the discs 2 between them, upon a lifting platform 50 supported within the magazine 3 upon a spring 51 which constantly tends to lift the said platform. The latter is guided in its rising and falling movement in the magazine by means of rollers 52 engaging the sides of the magazine, and by means of a vertical upstanding screw-threaded rod 53 fixed to the bottom of the magazine and passing through a central hole in the platform 50 and through the holes of the records and discs 2, its upper end being in alignment with but slightly spaced from the stud 18 of lifting magnet 16 when the lifting-magnet carriage 11 is in its initial position, as shown in Figure 4. Normally the top record of the pile is pressed against a stop 54 carried by an arm 55 swivelly mounted, for horizontal movement, upon the upper pivot end 56ᵃ of a vertical lever 56 pivoted at 57, upon a horizontal axis, in a bracket 58 mounted upon the top board 8 at one side of the magazine, so that when the said lever 56 is free to pivot at 57 the stop 54 is free to rise. The lever 56 depends into the interior of the cabinet below the top board 8 and its lower end is normally engaged by one end of a trip lever or detent 59 pivoted upon a hanger bracket 60, the other end of said trip lever being weighted, by armature 59ᵃ, lying beneath an electro-magnet 61. Normally the lever 56 and arm 55 with stop 54 are locked by the trip lever 59, and thus the top record of the pile is arrested in a position near the top of the guide rod 53, just below the lifting magnet 16; but when the magnet 61 is energized, as hereinafter described, the trip lever 59 is attracted so as to release the lever 56 and stop 54, so that the top record can be lifted by the lifting magnet 16 when the latter is energized, as shown in Figure 2 the stop 54 lifting freely as the record is raised. In order, however, to control the other records in the pile while the stop is inoperative and the top record is being removed, a locking device is employed. Thus, (see Figures 4 and 5) pivoted upon a plate 62 secured to the underside of platform 50 is a pair of horizontal levers 63, 63, (Figure 5) respectively disposed one on each side of the threaded rod 53 and having notches 64 to fit around the rod, these notches having threads to engage the threads of the rod, thus constituting a clutch. Springs 65, acting on the outer ends of the levers, normally maintain the levers against stops 66, with the notches out of engagement with the rod, so that the platform is free to be raised by the spring 51. The outer ends of the levers 63 are spaced apart, and located between them is an electro-magnet 67 carried by the plate 62. When the said electro-magnet is energized, which is effected immediately before the stop 54 is released, it draws the two levers 63 towards one another so that the threaded notches 64 engage the threads of the rod 53 and thus lock the platform 50 against being raised while the top record is being lifted by the lifting magnet 16 as previously described.

The platform 50 is adapted to be held depressed, to facilitate loading of the magazine, by means of a sliding bolt 68 (Figure 4) engaging a hole 69 in the bracket 70 which carries the platform guide rollers 52. The said bolt 68 is connected by a link 71 to an arm 72 on a vertical shaft 73 extending above the top board 8 of the cabinet and adapted to be turned by means of a knob 74 upon its upper end in order to release the platform and enable the spring 51 to lift the records against the stop 54. The arm 55 is swung about the pivot 56ᵃ during loading, but is returned to its normal position prior to the release of the bolt 68.

Referring, now, to the circuit diagram in Figure 16 which shows a convenient circuit for operating the gramophone from alternating current mains, the input leads 7 are connected to the primary winding 75 of a transformer, the secondary windings 76 of which are included in the circuit of a rectifier valve 77 whereby direct current may be obtained from bus-bar leads 78, 79, proceeding from the rectifier circuit. Connected across these leads is an electro-magnetic switch or relay 80 controlling the opening and closing of one of the input leads 7, the said switch 80 being open prior to the starting of the gramophone. A push-button starting switch 81 is adapted to be operated, at starting, to temporarily bridge the gap in the lead 7 controlled by switch 80. This completes the circuit to the transformer and the electro-magnetic switch 80 is thus energized in order to maintain the input circuit closed after the starting switch has been released. The said starting switch 81 also temporarily completes a circuit 82 through the motor 22 for starting the latter, and thus setting in motion the main shaft 24.

The said main shaft 24 drives through worm gearing 83 (Figure 9) a longitudinal shaft 84 upon which is fixed a series of seven cams 85, 86, 87, 88, 89, 90 and 91 which respectively co-operate with and serve to close seven spring-opened switches 92, 93, 94, 95, 96, 97 and 98. The said cams are angularly set upon the shaft 84 in the relative positions shown in Figure 15, and come into operation in sequence, to close the respective switches, in the order given. All the switches are normally open, when the shaft 84 is not rotating, the cams being then in the positions shown in Figure 15, and they cause the switches to be closed and opened once during each revolution of shaft 84, but the duration of time during which the different switches remain closed during each such revolution varies in accordance with the shapes given to the different cams. Switch 92, operated by cam 85, is connected in a circuit 99 (Figure 16) between the bus-bar leads 78, 79, such circuit including an electromagnetic switch or relay 100 adapted, when energized, to close a branch lead or circuit 101 between the circuit 82 and one of the input leads 7 in order to maintain the supply of current to the motor 22 when the starting switch 81 has been released. The said switch 92 is adapted to be closed by cam 85 immediately the motor 22 has been started by the push button switch 81, and the said cam is so shaped as to maintain the said switch 92 closed, and thus maintain the supply of current to the motor, throughout practically the entire revolution of shaft 84.

The second cam-operated switch 93 controls the magazine clutch magnet 67 in order, when closed, to connect the latter across leads 78, 79, its cam 86 being so shaped and set as to quickly close the switch after the main shaft 24 has been set in motion and thus cause the clutch 63 to lock the magazine platform, said switch remaining closed for half a revolution of the cam shaft 84. The third cam-operated switch 94 controls the magazine stop release magnet 61 in order, when closed, to connect the latter across leads 78, 79, in parallel with the magazine clutch magnet 67. Its cam 87 is set and shaped so as to close the switch to cause the stop 54 to be released immediately after the magazine clutch 63 has been operated, but it is only in operation for a short time in order to release the trip 59. The fourth cam-operated switch 95 controls the lifting magnets 15, 16, in order, when closed, to connect them in series across the leads 78, 79, in parallel with magnets 67, 61. It closes immediately the record stop has been released, so as to energize the magnets and cause the record on the turntable and the top record of the magazine to be lifted, and it remains closed throughout the forward travel of the carriage at the end of which it is opened to cause the records to be dropped into the well 5 and on to the turntable respectively. The fifth cam-operated switch 96 is for a purpose to be hereinafter described. Switch 97 serves to energize the forward-drive clutch solenoid 38 by connecting it across the leads, to give a forward drive to the lifting carriage. This switch is closed by its cam 90, to start the carriage motion, soon after the lifting magnets have been energized, and remains closed for a quarter of a revolution of the cam shaft, when it closes to de-energize the solenoid 38. Immediately this happens the seventh switch 98 is closed by its cam 91 to connect the reverse-drive solenoid 39 in circuit, causing the carriage to be returned. This switch remains closed for a quarter of a revolution of the cam shaft. On the completion of one revolution of the said cam shaft the cams take their initial positions shown in Figure 15, and the switch 92 opens to de-energize the relay 100 and stop the motor 22.

The cam shaft 84, besides carrying the switch cams described above, has also fixed upon it two other cams 102 for raising and lowering the pick-up carrier arm, as shown in Figures 6 and 9. These cams co-operate with rollers 103 provided upon a rocker frame 104 (Figure 6) pivoted at 105 upon a bracket 106 attached to the underside of the top plate 8 of the cabinet. The end of the rocker frame 104 which is remote from the cams is pivoted (Figure 9) to a cross-bar 107ª carrying a pair of vertical links or rods 107 extending through the top board 8 and jointed to the rear ends of lifting levers 108 pivoted at 109 to upstanding pillars or brackets 110. The forward ends of the levers 108 are pivoted to a pair of pick-up carrier arm rods 111 (Figures 1 and 6) the rear ends of which are slidably mounted in a cross-shaft 112 rotatably supported between the pillars 110. An electrical pick-up or reproducer 113 is slidably mounted upon the rods 111, and also freely slidable on the said rods is a switch carrier 114 (see Figures 1, 6, 7 and 8) consisting of a block of insulating material carrying insulated spring contacts 115 which tend to close together, as shown in Figure 8, to complete a connection between lead 79 and circuit 99 in the circuit diagram (Figure 16). Normally, however, the contacts 115 are kept separated by an insulated wedge member 116 on the pick-up 113, said wedge having a recess 117 engaged by one of the contacts to cause the pick-up and switch carrier to be temporarily held together. When the cam 102 is in the position shown in Figure 6, that is, when the cam shaft 84 has been brought to rest after a revolution of the switch cams, as previously described, the pick-up will have been lowered on to a record on the turntable, as shown by full lines in Figure 6. During the playing of the record the pick-up will slowly slide along the rods 111 and will draw the switch carrier 114 with it, the switch contacts 115 remaining open. When the needle moves into the usual run-off groove of the record at the termination of playing, as shown by dotted lines in Figure 6, the sudden forward movement of the pick-up will cause, due to the inertia of the switch carrier or to the friction of the rods 111, the withdrawal of the wedge member 116 from between the contacts 115, and thus the latter will close together, as in Figure 8, to complete a circuit through the relay 100, thereby connecting the motor 22 to the supply mains and causing the rotation of the main shaft 24 and cam shaft 84. The cams 102 will thereupon operate the rocker 104 so as to actuate links 107 and levers 108 and thereby raise the pick-up carrier arm rods 111 into the inclined position shown in Figure 6ª. The pick-up 113 and switch carrier 114 thereupon slide back along the rods 111 until the carrier 114 is arrested by a stop lever 118 which will presently be more fully described. The pick-up 113 moves down against the arrested carrier 114 and, by reason of the momentum, the wedge member 116 is forced between the contacts 115 so as to separate the same and at the same time, couple the switch carrier to the pick-up. Prior to the separation of the contacts 115, however, the switch 92 will have been closed by the cam 85, and the sequence of operation of the various switches will take place as previously described, while the pick-up carrier arm remains raised, to enable the played record to be removed from the turntable and a new record to be deposited thereon. When the lifting-magnet carriage has been returned to its initial position, the low portions of the cams 102 move beneath the rollers 103 and allow the pick-up carrier arm to fall so as to lower the pick-up on to the fresh record on the turntable, which continually revolves. The record is thus played and the sequence of operations is repeated as previously described. The stop lever 118 is pivoted at 119 and projects upwardly between the tone-arm rods 111, and its angular position is arranged to be automatically changed according to whether the record to be played is a 10-inch record or a 12-inch record, so as to determine the position which the pick-up takes upon the rods 111 prior to its being lowered on to the record. The position of the lever 118 for playing 10-inch records is shown in Figure 6 and Figure 6ª by full lines, and for playing 12-inch records by dotted lines. The lower end of the said lever 118 has a slot 120 engaged by a pin 121 on a horizontal lever 122 (Figure 9) which is pivoted at 123 and which is connected at 124 to a slide 125 normally drawn back by a spring 126 which maintains the lever 118 in the position shown by full lines in Figure 6. The slide 125 carries an upstanding peg 127 projecting through a slot 128 in the top board 8 so as to project above the said board in the path of the edge portion of a 12-inch record while the latter is being transported by the carriage. Thus, when a 12-inch record is carried to the turntable, its edge strikes the peg 127 and moves the lever 118 over to the dotted line position (Figure 6), so that the pick-up will move further along the rods 111, into a starting position suitable for playing the 12-inch record when it is lowered on to the said record. The lever 118 is retained in the 12-inch position by one arm of a weighted trip lever 129 (Figure 6) engaging its lower end. The other arm of the lever 129 carries an armature 130 co-operating with an electro-magnet 131 which is connected in the circuit as shown in Figure 16 and is energized by the closing of the switch 96 by means of the cam 89 previously referred to. When the magnet is thus energized the trip lever 129 is released, and the stop lever 118 is returned to the 10-inch position by the spring 126 acting on the slide 125. This takes place just prior to the carriage being started to convey a record to the turntable, the magnet 131 being energized only momentarily, to cause the lever to be tripped. Thus, as the record passes to the turntable, the stop lever 118 is always in the 10-inch position, shown by full lines in Figure 6. If the record is a 10-inch one, the said lever remains in that position, as it is not engaged by the record, but if it is a 12-inch record, the periphery of the latter will engage the peg 127 and cause the stop lever to be moved to the dotted-line position. The lever will be retained in that position by the trip lever 129 until the carriage commences its next forward movement.

A summary of the sequence of operations is as follows:—Assuming a record has just been played, the circuit through relay 100 is completed by the pick-up carrier arm switch 115 to start the motor 22 and the main shaft 24. The pick-up carrier arm is raised by the cam 102, the pick-up slides back, switch 115 is opened but the circuit to the motor 22 is maintained closed by the switch 92 being closed by the cam 85. Cam 86 then closes switch 93 to operate the magazine clutch and lock the magazine platform 50. Immediately after, the record stop 54 is released by switch 94 being momentarily closed by cam 87. At the same time the lifting magnets 15, 16, are energized, the record on the turntable and the top record of the magazine being raised and held by the said magnets in an elevated position. During the lifting of the top record the stop arm 55 is freely raised. The magnet 131 is now energized momentarily to operate the trip lever 129 to cause the pick-up stop lever to be restored to the 10-inch position (in full lines, Figure 6) should the previous record played have been a 12-inch record. Next, the carriage 11 is started in the forward direction due to the energization of solenoid 38 by the closing of switch 97, the winding drum 21 being driven from the main shaft in the forward direction. The two records on the carriage are thus transported to the left, the new record, if it is a 12-inch one, adjusting the stop lever 118, until the new record from the magazine is immediately over the turntable and the played record held by magnet 15 is over the well 5, the carriage being then stopped by the opening of switch 97. The magnets 15, 16, are now de-energized by the opening of switch 95, and the records fall, the played record into the well 5 and the fresh record on to the constantly revolving turntable. The carriage is then reversed, by the closing of switch 98 by means of cam 91, in order to reverse the drive of the winding drum. The pick-up carrier arm is next lowered to take the pick-up on to the new record, which is then played, and the operation is repeated until all the records in the magazine have been played. The magazine platform 50 is released during the return travel of the carriage, so that the spring 51 can again raise the pile of records against the stop, which is re-locked immediately the top record of the pile has been removed. Selective means are provided whereby continuous automatic playing of a series of records may be obtained, as above described; or whereby any particular record may be repeated automatically; or whereby independent playing, with hand changing of the records, may be obtained. Thus, (see circuit diagram, Figure 16) a control switch 132 normally, in the position shown by full lines, couples two contacts 133, 134, together and to the lead 78, said contacts being respectively in the circuit 99 of motor relay switch 150

100, and connected to the solenoids 38, 39, controlling the forward and reverse drive of the carriage. In this position continuous automatic playing is obtained, as previously described. When the switch 132 is moved into the dotted line position 132ª the solenoids operated by cam switches 93 to 98 are cut out and thus the only action that takes place is the raising and lowering of the pick-up arm, so that the record on the turntable will be repeated indefinitely. In the position shown by dotted lines at 132ᵇ, the switch also cuts out the motor 22, by opening the circuit 99, and the only driven member of the gramophone is the turntable, the records being adapted to be changed by hand in the usual manner. Preferably the control switch 132 is mechanically coupled, as indicated at 148, to a switch 149 in the circuit of the turntable motor 6, said switch 149 co-operating with three contacts 150, 151, 152, arranged as shown, so that when the control switch is in position 132 or 132ª for continuous or repeated playing the turntable motor will be connected directly across the leads 7, but when the switch 132 occupies position 132ᵇ for independent playing, the motor switch 149 will engage contact 152 so as to include a hand-switch 153 in circuit with the motor, whereby the turntable motor may be controlled by hand to start and stop the turntable.

In order that any record placed on the turntable may be rejected or removed before being completely played, a hand-operated switch 135 is provided in parallel with the tone-arm switch 115, being adapted to close the circuit to the motor relay switch 100 in order to expedite the normal automatic changing operation.

To ensure the operation of the gramophone being automatically stopped when the last record of the series has been played, a master switch 136 is provided in circuit with the electromagnetic relay switch 80 in the primary circuit of the transformer (see Figure 16). This master switch (see Figures 6, 9 and 10) consists of a spring-pressed vertical plunger 136 sliding in a housing 137 attached to the underside of the top board 8 of the cabinet, above the middle of the cross-bar 107ª carrying the tone-arm lifting rods 107. The plunger 136 is normally forced downwards by its spring against a stop to cause a metal insertion 138 to bridge spring plungers 139 in the housing, to complete the circuit through the relay 80, the plunger 136 being normally unaffected by the upward movement of the cross-bar 107ª when the pick-up is lowered on to the record. In the top face of the turntable 4 (Figure 6) an annular groove 140 is provided, normally covered by the records, but when there is no record on the turntable, after the last record has been played, the needle of the pick-up will be lowered into the said groove 140, and by reason of the resultant abnormal lowering of the pick-up carrier arm the cross-bar 107ª will rise excessively and will engage and raise the master switch plunger 136, thereby breaking the circuit through the relay switch 80 which will consequently open the input circuit 7, thus stopping the entire operation of the gramophone, including the turntable motor 6. As the master switch 136 may be open when starting the gramophone, it is necessary to depress the starting switch 81 long enough to ensure the motor 22 operating until the pick-up has been raised from the groove 140 in the turntable, so that the switch 136 will open.

Any valve amplifying devices associated with the pick-up, may be connected across the input terminals of the transformer. Preferably the magazine platform 50 is connected to a platform 141 (Figure 2ª) in the played-record well 5 by means of two cables 142, 143, running over guides or pulleys 144, 145. The platform 141 slides on a fixed central plain spindle 146 over which the records are dropped and a spring 147 tends to lift the said platform and the used records. When the magazine platform is depressed, for re-loading, the pile of played records will be raised from the well 5 and can thus be readily removed. The springs 51, 147, are suitably proportioned, and are attached to the respective platforms 50, 141, so that when the magazine is fully loaded, with the platform 141 raised to its maximum height, the spring 51 is fully compressed while the spring 147 is extended beyond its normal or natural limit of expansion, so that the latter spring assists the magazine spring 51 to raise the pile of records in the magazine. On the other hand, when the played records in the well 5 exceeds the number remaining in the magazine, the compression of the spring 147 tends to retard the excessive upward pull transmitted from platform 141 through the cables 142, 143, to the magazine platform 50, and this effect is still further accentuated by the extension of spring 51 beyond its natural limit of expansion.

Instead of the records being lifted by means of electro-magnets, as hereinbefore described, solenoids may be provided fitted with plungers or cores adapted to operate record gripping or holding devices. Thus, as shown in Figure 17, each of the arms of the carriage (the arm 14 is shown) is provided, at its outer end, with a solenoid 154 in place of the electro-magnet. This solenoid encloses a vertically-moving plunger or core 155 normally raised by means of a spring 156 and having a stem 157 projecting below the solenoid. The lower end of the stem 157 is slightly tapered to engage firmly within the hole in a record, and the solenoid and plunger are so positioned that the stem 157 lies immediately over the centre of the record 1 on the magazine platform 50 when the carriage is in its initial position. The plunger stem of a similar solenoid on the other arm of the carriage lies over the centre of the record on the turntable. After the magazine platform 50 has been locked by the clutch device and the record stop 54 has been released as hereinbefore described, the solenoid 154 is energized, causing the plunger 155 to be pulled down sharply and the tapered end of the stem 157 to enter the hole in the record to grip the latter by its frictional engagement. The other solenoid is simultaneously energized so that its plunger similarly engages the record on the turntable. To allow of this engagement the upper end of the central guide rod 53 of the magazine has a spring-supported terminal 158 that normally engages the hole in the top record but which can be depressed by the plunger stem 157. The central record-receiving pins of the turntable and played-record well are also constructed so as to be depressible when engaged by the said plunger stem. After the said engagement of the plunger stems with the records the solenoids are de-energized and the spring 156 raises the plunger together with the record. Both records (at the top of the magazine and on the turntable respectively) are simultaneously raised in this manner and the carriage is then set in motion to carry them respectively over the well 5 and over the turntable, as in the first-described arrangement. The carriage is then arrested while the solenoids are again energized. This causes the plungers to be pulled down sharply, engaging and depressing the record-receiving pins, and by reason of the downward momentum of the records they are caused to drop. The solenoids are de-energized and the carriage returns.

Having fully described my invention, what I desire to claim and secure by Letters Patent is:—

1. An automatic gramophone comprising a turntable, a self-contained sliding cantilever carriage unit having a forwardly-extending overhanging portion movable over said turntable, guiding and supporting means for the carriage unit situated entirely behind said turntable, two spaced record-lifting devices mounted on the carriage unit, means for reciprocating the carriage unit alternately in opposite directions to take the record-lifting devices into positions respectively over the turntable and over a pile of records to be played, and into other positions respectively clear of the turntable and over the turntable, and means for causing the record-lifting devices respectively and simultaneously to lift a record from the turntable and from the said pile of records while they are in the first-mentioned positions and to hold the same suspended from said devices while the said devices are being taken into the other positions, and for then releasing the records from the said devices while the latter are in the said other positions.

2. An automatic gramophone comprising a turntable, a reproducer, a sliding carriage having a forwardly extending overhanging portion movable over the turntable, guiding and supporting means for the carriage situated behind the turntable, two spaced electro-magnetic record-lifting devices fixed upon the carriage for simultaneous movement therewith, means for reciprocating the carriage alternately in opposite directions to carry the record-lifting devices first from an initial position with one of the devices over the turntable and the other over a pile of records to be played, into a forward position with the first-mentioned device clear of the turntable and the other over the turntable and then from said forward position back to the initial position, means for energizing the said devices simultaneously to cause records to be lifted each time the carriage returns to the initial position and to be held suspended from the said devices while they are carried by the carriage during each forward travel of the carriage, and means for controlling the said devices to cause the records to be dropped while the carriage is in the said forward position, the said carriage being normally at rest in the inital position during the playing of a record, and means controlled by the reproducer being provided for effecting the energization of the magnetic devices and the lifting of the records and also the movement of the carriage from the initial to the forward position after the termination of playing of a record.

3. An automatic gramophone comprising a turntable, a reproducer, a sliding carriage, means for guiding said carriage, two electro-magnetic record-lifting devices fixed upon the carriage above the level of the turntable, a motor for causing the carriage to move alternately in opposite directions, means controlled by the reproducer for starting the motor when a record has been played, means for operatively connecting the motor to the carriage for traversing the same alternately in opposite directions, means for stopping the carriage when it returns to an initial position with one record-lifting device over the turntable and the other over a pile of records to be played, and means operated by the motor, when a record has been played, for energizing and de-energizing the record-lifting devices to cause two records to be lifted and held by said devices each time when the carriage is in its initial position at one end of its travel, and to cause the records to be released when the carriage is at the other end of its travel.

4. An automatic gramophone comprising a turntable, a reproducer, a sliding carriage, means for guiding the carriage, two electro-magnetic record-lifting devices fixed in definite spaced relationship upon the carriage, a motor for driving the carriage, means controlled by the reproducer for starting the motor when a record has been played, means for automatically connecting the motor to the carriage whereby the latter is first moved from its initial position with one of the lifting devices over the turntable and the other over a pile of records to be played to one end of its travel, then stopped and re-started in the opposite direction and finally stopped in its initial position, means whereby the reproducer is automatically raised when the carriage commences its movement from the initial position and is lowered when the carriage returns to its initial position, and means operated by the motor, when a record has been played, for energizing the record-lifting devices to cause records to be lifted and held by said devices when the carriage is in its initial position and for causing the records to be released when the carriage is at the opposite end of its travel.

5. An automatic gramophone comprising a reproducer, a sliding carriage, movable alternately in opposite directions, means for guiding the carriage, two record-lifting electro-magnets fixed upon the carriage in definite spaced relationship and above the level of the turntable, an electric motor for driving the carriage, a starting switch in the motor circuit said switch being operated by the reproducer, when a record has been played, to start the motor, means operated by the motor for moving the carriage from an initial position with one lifting device over the turntable and the other over a pile of records to be played to the opposite end of its travel and then reversing the movement and stopping the carriage in its initial position, and means operated by the motor, when a record has been played, for energizing the electro-magnets while the carriage is in its initial position to cause two records to be lifted and held by said devices and for de-energizing the same when the carriage is at the opposite end of its travel.

6. An automatic gramophone comprising a turntable, a reproducer arm, a sliding carriage, movable alternately in opposite directions, means for guiding the carriage, two electro-magnetic record lifting devices in definite spaced relationship on the carriage and above the level of the turntable, an electric motor, a reproducer device movable on the reproducer arm, a switch on the reproducer arm and connected in the motor circuit, said switch remaining open during the playing of a record, means for causing the switch to close when the record has been played in order to start the motor, means operated by the motor for moving the carriage from an initial position with one of the lifting devices over the turntable and the other over a pile of records to be played to the opposite end of its travel and then reversing its movement and stopping the carriage in its initial position, and means operated by the motor for energizing and de-energizing the electro-magnetic record-lifting devices to cause records to be lifted while the carriage is in its initial position and to be released when the carriage is at the opposite end of its travel.

7. An automatic gramophone comprising a pivoted reproducer arm, a main travelling carriage movable alternately in opposite directions, two electro-magnetic record-lifting devices mounted on the carriage, an electric motor, a reproducer device slidable on the reproducer arm, a switch carriage slidable on the reproducer arm and having contacts in the motor circuit tending to close together to complete the motor circuit, a separating member carried by the reproducer device engaging between the contacts during the playing of a record so as to separate the contacts and temporarily couple the reproducer device and switch carriage, the separating member being adapted to be suddenly withdrawn from the contacts and the reproducer device de-coupled from the switch carriage when the reproducer device enters the run-off groove of a played record, means operated by the motor for moving the travelling carriage from an initial position to the opposite end of its travel and then reversing its movement and stopping the carriage in its initial position, means controlled by the motor for energizing and de-energizing the electro-magnetic record-lifting devices to cause records to be lifted while the carriage is at one end of its travel and to be released when the carriage is at the opposite end of its travel, a cam device operated by the motor to cause the reproducer arm to be automatically raised and the reproducer device re-coupled to the switch carriage after the playing of a record and to be lowered when the main carriage returns to the initial position, a switch for maintaining the motor circuit closed when the switch contacts on the reproducer arm have been opened after the raising of the reproducer arm, and a cam operated by the motor for controlling the said switch.

8. An automatic gramophone comprising a turntable, a reproducer, a sliding carriage, movable alternately in opposite directions, means for guiding the carriage, two electro-magnetic record-lifting devices in definite spaced relationship on the carriage and above the level of the turntable, an electric motor, means operated by the motor for moving the travelling carriage from an initial position with one of the lifting devices over the turntable and the other over a pile of records to be played to the opposite end of its travel, stopping it at said end of the travel, and then reversing its movement and stopping the carriage in its initial position, a switch for closing a circuit through the electro-magnetic record-lifting devices, a cam operated by the motor for controlling the said switch so as to cause the electro-magnetic devices to be energized and de-energized to lift and release the records at the required times, means operated by the motor for lifting the reproducer and causing it to return to a starting position after playing of a record, a switch in the motor circuit, said switch being controlled by the reproducer so as to close and start the motor when a record has been played, and a switch operated by a part driven by the motor for maintaining the motor circuit closed when the reproducer is lifted and until the carriage returns to its initial position.

9. An automatic gramophone comprising a travelling carriage movable alternately in opposite directions, two electro-magnetic record-lifting devices mounted on the carriage, an electric motor, reversible gearing for driving the carriage from the motor, electro-magnetic devices for controlling the gearing to cause the carriage to be driven in one direction or the other, switches controlling the said electro-magnetic devices, and cams driven by the motor for operating said switches in order to cause the carriage to move alternately in opposite directions at the required times.

10. An automatic gramophone comprising a travelling carriage movable alternately in opposite directions, two electro-magnetic record-lifting devices mounted on the carriage, a switch for controlling the circuit through the electro-magnetic devices, a cam for operating the switch, a pivoted reproducer arm, a cam for lifting the said arm when a record has been played, an electric motor, reversible driving means for causing the motor to drive the carriage alternately in opposite directions, electro-magnetic means for controlling said driving means, switches controlling the said electro-magnetic means, cams operating said switches, and a shaft driven from the motor upon which all the said cams are mounted.

11. An automatic gramophone comprising a turntable, a travelling carriage for carrying a record to the turntable, a movable reproducer, a movable stop lever for determining the initial position of the reproducer for commencing the playing of a record, means for raising the reproducer from a record and for causing it to move away from the centre of the record towards the stop lever when the record has been played, a spring-actuated member maintaining the stop lever in operative position for small records, a striker part carried by the said member and situated in the path of a larger record so as to be engaged and operated by the edge of such larger record when the latter is being carried on the carriage to the turntable and thus move the stop lever angularly to an operative position for the larger record, a trip lever for retaining the stop lever in such operative position for the larger record, an electro-magnet for subsequently releasing the trip lever, and means for energizing said electro-magnet prior to the next record being carried towards the turntable.

12. An automatic gramophone comprising a travelling carriage movable alternately in opposite directions, two electro-magnetic lifting devices mounted on the carriage, an electric motor, reversible gearing for driving the carriage from the motor, two electro-magnetic devices for controlling the gearing to cause the carriage to be driven in one direction or the other, switches controlling the said electro-magnetic devices, cams driven by the motor for operating said switches in order to cause the carriage to move alternately in opposite directions at the required times, means whereby the gearing is in a neutral position when neither of the electro-magnetic devices is energized, and switch means for interrupting the circuit to both electro-magnetic devices during the operation of the cam-controlled switches in order to render the carriage inoperative and permit of the playing of a record being repeated.

13. An automatic gramophone comprising a reproducer arm, a travelling carriage movable alternately in opposite directions, two electro-magnetic record lifting devices mounted on the carriage, an electric motor, a reproducer device movable on the reproducer arm, a switch on the reproducer arm and connected in the motor circuit, means on the reproducer device to maintain said switch in open position during playing of the record, said reproducer device acting to close said switch when the record has been played to start the motor, means operated by the motor for moving the carriage from its initial position to the opposite end of its travel and then reversing its movement and stopping the carriage in its initial position, means operated by the motor for energizing the electro-magnetic record-lifting devices while the carriage is in its initial position and for de-energizing the same when the carriage is at the opposite end of its travel, and a rejector switch in parallel with the reproducer-operated switch to enable the motor circuit to be closed before a record has been completely played.

14. An automatic gramophone comprising a turntable, a travelling carriage, two spaced solenoids mounted upon the carriage, plungers within the solenoids, record holding devices operated by the plungers, means for moving the carriage alternately in opposite directions to carry the solenoids first into a position with one of them over the turntable and the other over a pile of records to be played and then into a position with the first-mentioned solenoid clear of the turntable and the other over the turntable, means for energizing the two solenoids while they are in the first-mentioned position to cause the plungers to operate the record holding devices to hold the records, means for de-energizing the solenoids, springs for raising the plungers and records, means for re-energizing the solenoids while they are in the second-mentioned position to cause the plungers to quickly descend, and means for again de-energizing the solenoids.

15. An automatic gramophone comprising a turntable, a magazine for a pile of records to be played, a spring-supported platform in the magazine, means for removing played records from the turntable and for carrying records from the magazine to the turntable, a clutch device for intermittently locking and releasing the platform, a part co-operating with the clutch device to hold the platform, an electro-magnetic device operable upon the clutch device, and means whereby the electro-magnetic device is alternately energized and de-energized to lock and release the platform in synchronism with the transfer of the records to the turntable.

16. An automatic gramophone comprising a turntable, a magazine for a pile of records to be played, a spring-supported platform in the magazine, a central fixed guide rod in the magazine passing through the platform, means for removing played records from the turntable and for carrying records from the magazine to the turntable, two clutch levers mounted upon the platform on opposite sides of the guide rod, springs normally maintaining the clutch levers out of engagement with the rod, an electro-magnet disposed between the levers so as to be adapted when energized to move the levers into engagement with the rod to hold the platform, and means for automatically energizing and de-energizing the said electro-magnet to lock and release the platform in synchronism with the transfer of the records to the platform.

17. An automatic gramophone comprising, a turntable, a magazine for a pile of records to be played, a record-supporting platform in the magazine, means for removing played records from the turntable and for carrying records from the magazine to the turntable, means constantly tending to lift the platform and records thereon, a clutch device for intermittently locking and releasing the platform, a part co-operating with the clutch device to hold the platform, an electro-magnetic device operable upon the clutch device, means whereby the electro-magnetic device is alternately energized and de-energized to lock and release the platform, a movable stop lever determining the amount of lift of the platform when the clutch device is released, a trip lever adapted to hold the stop lever in an operative position, and an electro-magnetic device controlling the trip lever, the stop lever being released by the trip lever when the clutch device is in its platform-locking position.

18. An automatic gramophone, comprising a turntable, a sliding carriage, means for guiding the carriage, two spaced record-lifting devices mounted on the carriage, a motor for driving the carriage to move said carriage from an initial position with the record-lifting devices respectively over the turntable and a pile of records to be played, into a forward position with the said devices respectively clear of the turntable and over the turntable, means for operating said record lifting devices to lift and hold the records respectively when the carriage is in the initial position and to drop records when in the forward position, a winding drum driven by the motor, a cable attached to opposite ends of the carriage and wound upon the drum, so that one end is wound on to the drum and the other end paid off during rotation of the drum, means for starting the motor to give the forward travel to the carriage, means for reversing the direction of rotation of the drum when the carriage reaches its forward position, and means for stopping the drum when the carriage returns to its initial position.

19. An automatic gramophone comprising a turntable, a self-contained sliding cantilever carriage consisting of a vertical rear part having outwardly-extending laterally-spaced rigid overhanging arms movable over the turntable, vertically-spaced longitudinal guide rails behind the turntable for supporting and guiding the vertical rear part of the carriage, two electro-magnetic record-lifting devices mounted upon the ends of the carriage arms, said devices being movable in a path immediately above the center of the turntable and a pile of records to be played, means for reciprocating the carriage alternately in opposite directions to carry the record-lifting devices first from an initial position with one of the devices over the turntable and the other over the pile of records to be played, and then into a forward position with the first-mentioned device clear of the turntable and the other over the turntable and then from said forward position back to the initial position, means for energizing the said devices simultaneously, while they are in the initial position, to cause records to be lifted and carried by the carriage, and means for controlling said devices to cause the records to be dropped while the carriage is in the forward position.

GEORGE STANLEY MANN.